No. 697,111.  Patented Apr. 8, 1902.
S. C. SULLIVAN.
MEANS FOR COOLING MILK CANS.
(Application filed Aug. 8, 1901.)

(No Model.)

Witnesses

Inventor
Samuel C. Sullivan
by H. C. Lord,
Atty.

UNITED STATES PATENT OFFICE.

SAMUEL C. SULLIVAN, OF ERIE, PENNSYLVANIA.

MEANS FOR COOLING MILK-CANS.

SPECIFICATION forming part of Letters Patent No. 697,111, dated April 8, 1902.

Application filed August 8, 1901. Serial No. 71,396. (No model.)

*To all whom it may concern:*

Be it known that I, SAMUEL C. SULLIVAN, a citizen of the United States, residing at Erie, in the county of Erie and State of Pennsylvania, have invented certain new and useful Improvements in Means for Cooling Milk-Cans; and I do hereby declare the following to be a full, clear, and exact description of the invention, such as will enable others skilled in the art to which it appertains to make and use the same.

This invention relates to means for cooling milk-cans; and it consists in certain improvements in the construction thereof, as will be hereinafter fully described, and pointed out in the claims.

The object of the invention is to provide a portable means for cooling milk-cans, so that milk in the cans may be kept cool during transportation, also forming said means so that the cover may be readily exposed, so that milk can be conveniently taken from the can as it is distributed.

Figure 1:
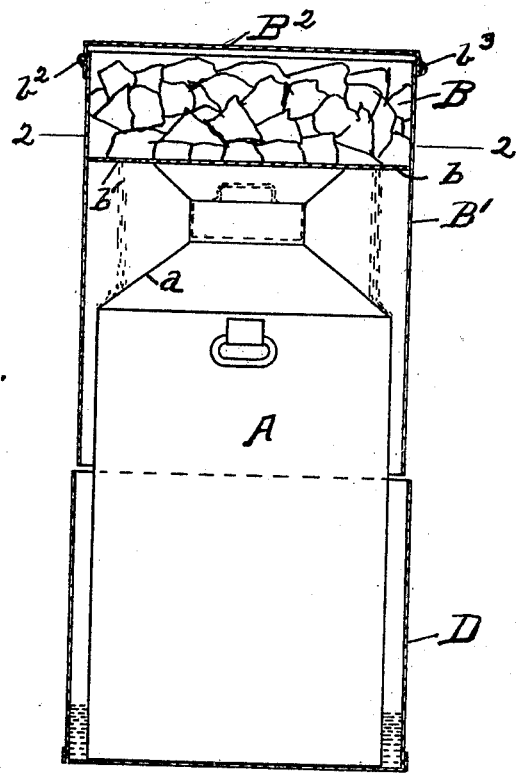
Figure 2:
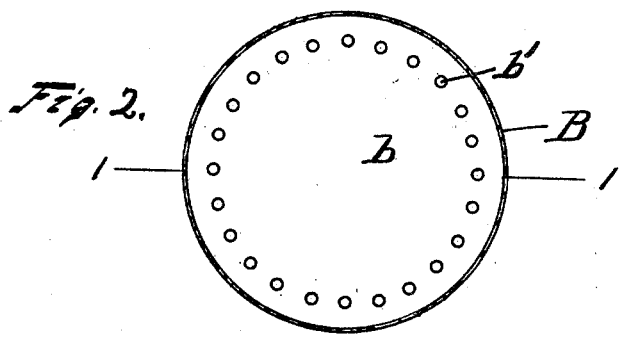

The invention is illustrated in the accompanying drawings, as follows:

Figure 1 shows a section of the cooling means on the line 1 1 in Fig. 2, the can being in elevation. Fig. 2 shows a section on the line 2 2 in Fig. 1.

A marks the milk-can, which is of the ordinary construction, having a contracted opening closed by the cover, as shown in dotted line. Resting on the top of the can is a receptacle B, having the bottom $b$ of the receptacle resting, preferably, upon the top of the can. The walls of the receptacle B are provided with the extension B', which forms an inclosure which fits loosely around the walls of the can A. In the drawings the space between the can and the inclosure is somewhat exaggerated; but it should be sufficient to allow the water dripping from the receptacle to freely pass between it and the extension B'. The extension B' also forms an air-space for insulating the can. The bottom $b$ is provided with a series of openings $b'$, which are arranged over the top wall $a$ of the can, so that the water dropping from the receptacle falls on the wall $a$ and passes down the side walls of the can A and forms a thin sheet of water. This through the cooling action of the liquid itself and the more or less evaporation tends to cool the can. Arranged on the top of the receptacle B is a cover $B^2$. It is secured by a hinge $b^2$ and hasp $b^3$. When it is desired to get the milk from the can, the receptacle B is simply removed, thus exposing the cover, and after getting the milk desired the ice-receptacle is replaced by simply slipping it down over the can.

I prefer to provide the bottom of the can with a water-receptacle D. This is formed, preferably, by extending a wall upwardly from the bottom of the can a short distance outside of the can, so that a narrow receptacle is formed around the can. As the water passes down over the can some of it is evaporated and the remainder is deposited in the receptable D, and in ordinary practice its temperature on reaching the receptacle is below the ordinary temperature of the milk, so that there is more or less a cooling effect by the water after reaching the receptacle D. I prefer that the walls of the receptacle D and extension B' practically inclose the can A in order that they may form an air-space around the can, which will to a large extent insulate it from outside heat.

What I claim as new is—

1. In a means for cooling milk-cans, the combination with a can having a contracted opening at the top and a top wall leading to said opening, of a removable ice-receptacle arranged on the top of the can, the bottom of said receptacle being provided with a series of openings within the area above the top wall of the can, whereby the water from the ice may pass from said openings onto the shoulder of the can.

2. In a means for cooling milk-cans, the combination with a can having a contracted opening at the top and a wall leading to said opening; of an ice-receptacle arranged on the top of the can and having a wall extending from the bottom thereof to a point below the top of the can, said receptacle being provided with an opening from which the water from the ice passes onto said top wall of the can and then down the side of the can between the walls of the can and the extension.

3. In a means for cooling milk-cans, the combination of the can, A, having the top wall, $a$; the removable receptacle, B, arranged on top of the can, having the extension, B', extending from the removable receptacle B, down below the top of the side walls of the can; the bottom, $b$, of the removable receptacle being provided with the opening, $b'$, and the cover, $B^2$, for closing the top of the removable receptacle, B.

In testimony whereof I affix my signature in presence of two witnesses.

SAMUEL C. SULLIVAN.

Witnesses:
 H. C. LORD,
 RENA F. LANZA.